United States Patent
Burke et al.

(10) Patent No.: US 9,278,236 B1
(45) Date of Patent: Mar. 8, 2016

(54) VICTIM RETRIEVAL SYSTEM, METHOD AND APPARATUS

(75) Inventors: Shane Donald Burke, Clearlake, CA (US); Lisa C. Mortimeyer, Reno, NV (US)

(73) Assignee: Flaresun Fire Group, Inc., Burlingame, CA (US)

( * ) Notice: Subject to any disclaimer, the term of this patent is extended or adjusted under 35 U.S.C. 154(b) by 146 days.

(21) Appl. No.: 13/553,654

(22) Filed: Jul. 19, 2012

Related U.S. Application Data

(60) Provisional application No. 61/509,941, filed on Jul. 20, 2011.

(51) Int. Cl.
*B66D 1/00* (2006.01)
*A62B 99/00* (2009.01)
*A61G 1/00* (2006.01)
*F16M 13/02* (2006.01)

(52) U.S. Cl.
CPC . *A62B 99/00* (2013.01); *A61G 1/00* (2013.01); *B66D 1/00* (2013.01); *F16M 13/02* (2013.01)

(58) Field of Classification Search
CPC .......... A62B 1/02; A62B 99/00; B66F 11/04; B66F 11/044; B66C 23/00; B66C 23/06; B66C 25/00; F16M 13/02; A61G 1/00; B66D 1/00
USPC ................. 182/2.1–2.3, 18, 69.6, 141–144; 212/223, 232, 242, 251, 258, 259, 71; 212/175, 177, 179, 180, 347, 276, 278; 414/563; 340/685; 254/323, 325, 383, 254/2 B, 2 C, 4 R, 134
See application file for complete search history.

(56) References Cited

U.S. PATENT DOCUMENTS

| | | | | |
|---|---|---|---|---|
| 2,738,939 | A * | 3/1956 | Johnson | 244/137.2 |
| 2,969,210 | A * | 1/1961 | Richardson et al. | 244/137.2 |
| 3,797,672 | A * | 3/1974 | Vermette | 52/116 |
| 3,934,847 | A * | 1/1976 | Bentivegna | 244/137.2 |
| 4,212,006 | A * | 7/1980 | Cakebread et al. | 340/685 |
| 4,383,792 | A * | 5/1983 | Seabloom et al. | 414/563 |
| 5,537,700 | A * | 7/1996 | Way et al. | 5/611 |
| 6,138,991 | A * | 10/2000 | Myers, Jr. | 254/323 |
| 6,401,863 | B1 * | 6/2002 | Kirkland | 182/142 |
| 6,894,621 | B2 * | 5/2005 | Shaw | 340/685 |
| 7,168,110 | B2 * | 1/2007 | Girard et al. | 5/89.1 |
| 7,216,386 | B2 * | 5/2007 | Sawatzky | 5/625 |
| 7,819,785 | B2 * | 10/2010 | Maiaro et al. | 482/104 |
| 7,942,243 | B1 * | 5/2011 | Blehm | 182/103 |
| 8,104,631 | B2 * | 1/2012 | Stegemann et al. | 212/179 |
| 2004/0026348 | A1 * | 2/2004 | Shaw | 212/276 |
| 2009/0145871 | A1 * | 6/2009 | Bond | 212/285 |
| 2009/0218167 | A1 * | 9/2009 | Lee | 182/142 |
| 2009/0285662 | A1 * | 11/2009 | Addleman et al. | 414/563 |

\* cited by examiner

*Primary Examiner* — Charles A Fox
*Assistant Examiner* — Kristine Florio
(74) *Attorney, Agent, or Firm* — Haverstock & Owens, LLP

(57) ABSTRACT

A victim retrieval apparatus for use with a vehicle. In some embodiments, the rescue basket comprises one or more wheels. The articulating head of the boom comprises a rotatable pulley for receiving the rescue line and is able to allow the vehicle to be parked in any position necessary while rescuing the victim. A knot-passing pulley enables a safety line (with emergency brake device) to be coupled to the basket thereby ensuring the safety of the victim in the basket at all times. The rescue basket comprises a remote control for controlling the winch speed that is able to be located at the winch itself, or be of a hand-held nature and attached at the rescue basket instead of at the vehicle if visual contact is problematic.

22 Claims, 5 Drawing Sheets

VICTIM RETRIEVAL SYSTEM, METHOD AND APPARATUS

RELATED APPLICATIONS

This application claims priority under 35 U.S.C. section 119(e) of U.S. Provisional Patent Application No. 61/509,941, filed Jul. 20, 2011, and entitled "Rescue Hoist System, Method and Apparatus," which is hereby incorporated by reference.

FIELD OF THE INVENTION

The invention relates to rescue by a mechanically assisted rescue hoist of victims from down an embankment. In particular, the invention relates to a rescue apparatus for providing a quick descent for rescuers from an ingress point and safe ascent for victims, cargo and rescuers to the egress point, which is the location from which the victim or cargo is being recovered.

BACKGROUND OF INVENTION

When a vehicle exits a roadway or other terrain, over-bank or cliff accidents occur. Victims are found down the embankment or cliff and in need of extrication and retrieval/rescue. These rescues are able to be particularly difficult because rescuers must be able to quickly and safely reach the victim without injury. The injured must be carefully retrieved in order to prevent further injury during retrieval. Rescue vehicles and personnel arriving on scene utilize a Z-Pulley System which is anchored to the vehicle using knots or a chock attached to the proximal end of the rope of the Z-Pulley System and is inserted into the spokes on the fire engine wheel or coupled directly to the fire engine itself. The Z-Pulley system can also be coupled to a tree or other stanchion. Rescues with the Z-pulley system setup are time consuming, require up to eight (8) responders, and provide at best a slow, bumpy ride up as rescuers negotiate the often dangerous terrain on foot while attempting to steady the basket containing the victim with sheer muscle.

SUMMARY OF THE INVENTION

Embodiments of the present invention are directed to a victim retrieval apparatus for use with a rescue vehicle. In some embodiments, the victim retrieval apparatus comprises a winch, a remote control for operating the winch, a fairlead assembly, rope or cable, side-load straps, large eye-bolts to secure the side-load straps, a two-piece head assembly that rotates to support loads in any direction without altering the parked position of the rescue vehicle. In some embodiments, the victim retrieval apparatus also comprises an adjustable strap system for leveling a rescue basket, rappelling harnesses for rescuers, a set of large carabineers and a rescue basket that is able to have a variety of vital sign detecting equipment and other rescue equipment. In some embodiments, the rescue basket comprises one or more wheels attached to the underside. The victim retrieval apparatus is able to also contain the addition of a capstan winch combined with a knot-passing pulley apparatus in case of a more distant point of rescue. A manned safety line and pulley (with emergency brake device) are coupled to the bottom of the rotating head assembly to ensure the position of the basket carrying the victim will not change should the main safety rope fail.

In some embodiments, the rescue basket also comprises a remote control for controlling the winch at the rescue basket or other positions remote from the vehicle, instead of at the vehicle where vision to the basket is able to be problematic. In operation, two rescuers are attached to the basket's downslope edge. They descend with the basket using their feet on the slope to maintain position while being allowed to descend by the winch on the vehicle above. The victim retrieval apparatus requires only a few minutes for assembly after the rescue vehicle arrives on scene. It is secured by a safety line and is remotely controlled to safely ferry rescuers to a victim down an embankment thus eliminating the need for visual signals between an operator at the vehicle and the rescuers at the basket. Thus, victim retrieval apparatus reduces the number of responders required to three (3), reduces the time down and up the embankment by half, and, due to its unique design, requires much less physical exertion by the rescuers while providing a stable platform that minimizes bumps and jostling the victim during ascent.

A first aspect of the present application is directed to a victim retrieval apparatus for retrieving victims from an area. The apparatus comprises a reel mechanism configured to controllably reel in or let out a tow line, a basket coupled to the reel mechanism via the tow line and a boom having a boom head, a rotatable pulley and one or more support beams, wherein the tow line is threaded from the reel mechanism to the basket through the boom head and onto the rotational pulley such that the rotational pulley rotates based on the outgoing angle of the tow line. In some embodiments, the support beams and rotatable pulley are detachably coupled together by the boom head. In some embodiments, the apparatus further comprises an anchor object having one or more hitches, wherein the support beams of the boom are detachably coupled to the anchor object via the hitches. In some embodiments, the apparatus further comprises one or more support members coupled between the support beams and the anchor object. In some embodiments, the anchor object is a vehicle. In some embodiments, the apparatus further comprises a safety line coupled to the basket, wherein safety line is positioned though a safety pulley on the boom head. In some embodiments, the basket comprises one or more wheels positioned on the bottom of the basket such that the basket is able to roll on the wheels. In some embodiments, the wheels are extendable such that the basket is able to be raised to a desired height while being supported by the wheels. In some embodiments, the basket comprises a controller that controls the operation of the reel mechanism. In some embodiments, the controller is detachably coupled to the basket. In some embodiments, the controller is a wireless controller that wirelessly communicates with and controls the reel mechanism. In some embodiments, the controller is voice activated. In some embodiments, the basket comprises a lifting rail positioned along the perimeter of a body of the basket. In some embodiments, the basket comprises a plurality of adjustable straps that are able to be adjusted in length and couple the basket to the tow line. In some embodiments, the apparatus further comprises a fair lead device coupled to the reel mechanism, wherein the fair lead device receives the tow line before the tow line enters or exits the reel mechanism in order to prevent the tow line from binding. In some embodiments, the apparatus further comprises a second reel mechanism coupled to the reel mechanism and the tow line for increasing the reeling power of the apparatus. In some embodiments, the apparatus further comprises a load alarm mechanism coupled with the reel mechanism such that during operation of the reel mechanism the load alarm mechanism is able to monitor the load on the reel mechanism. In some embodiments, the load alarm mechanism is configured to stop the reeling of the reeling mechanism if the detected load reaches a predetermined load threshold. In some embodiments, the load alarm mechanism is configured to cause one or more alarm signals to be output if the reel mechanism is in operation, if the detected load reaches the predetermined load threshold or if the detected load is approaching the predetermined load threshold. In some embodiments, the one or more alarm signals comprise one or more of audio signals, radio frequency signals and radio signals having a short wavelength and ultra high frequency (e.g. Bluetooth signals).

A second aspect of the invention is directed to a boom for use with a retrieval apparatus. The boom comprises a boom head having a body comprising one or more beam cavities, a pulley channel and a safety pulley, one or more support beams detachably coupled within the beam cavities and a rotatable pulley rotatably coupled within the pulley channel. In some embodiments, the support beams each comprise an angled stub configured to couple with a hitch of an anchor object. In some embodiments, the boom further comprises one or more support members detachably coupled to the support beams between the stubs and the boom head. In some embodiments, the rotatable pulley comprises a bearing element positioned between the rotatable pulley and the pulley channel for facilitating the rotation of the rotatable pulley within the pulley channel. In some embodiments, the bearing element comprises a protective collar or one or more ball bearings. In some embodiments, the boom further comprises a reel mechanism that is detachably coupled to the support beams. In some embodiments, the reel mechanism comprises a base plate and the support beams each comprise a stop channel that receives the base plate when the reel mechanism is coupled to the support beams. In some embodiments, the stop channels each comprise a side wall that abuts the side of the base plate when the reel mechanism is coupled to the support beams such that the reel mechanism is prevented from moving laterally with respect to the boom. In some embodiments, the base plate comprising a plurality of plate apertures and the support beams each comprise a beam apertures that align with one of the plate apertures when the reel mechanism is coupled to the support beams. In some embodiments, the boom further comprises a pin for each of the plate apertures that are positioned within the aligned plate and beam apertures in order to secure the reel mechanism to the support beams.

A third aspect of the invention is directed to a method of retrieving a victim from an area. The method comprises coupling together one or more support beams and a rotatable pulley with a boom head in order to form a boom, coupling the boom to an anchor object with the support beams, coupling a tow line from a feed mechanism to a basket by threading the tow line through the boom head onto the rotatable pulley and to the basket, wherein the rotatable pulley rotates based on the outgoing angle of the tow line and activating the feed mechanism with a controller such that the basket is retracted or extended as desired by reeling in or letting out the tow line. In some embodiments, the method further comprises coupling a rescue line from a secure point to the basket by threading the rescue line through a safety pulley coupled to the boom head. In some embodiments, the basket comprises one or more wheels positioned on the bottom of the basket. In some embodiments, the method further comprises extending the one or more wheels of the basket to a desired height. In some embodiments, the method further comprises coupling one or more support members between the support beams and the anchor object. In some embodiments, the anchor object is a vehicle. In some embodiments, the basket comprises a controller that controls the operation of the reel mechanism. In some embodiments, the controller is detachably coupled to the basket. In some embodiments, the activation of the feed mechanism comprises issuing voice commands to the controller. In some embodiments, the controller is a wireless controller that wirelessly communicates with and controls the reel mechanism. In some embodiments, the basket comprises a lifting rail positioned along the perimeter of a body of the basket, further comprising a rescuer coupling to basket via the lifting rail. In some embodiments, the basket comprises a plurality of adjustable straps that couple the basket to the tow line, further comprising a rescuer adjusting the length of the adjustable straps in order to level the basket. In some embodiments, the method further comprises a fair lead device coupled to the reel mechanism, wherein the fair lead device receives the tow line before the tow line enters or exits the reel mechanism in order to prevent the tow line from binding. In some embodiments, the method further comprises a second reel mechanism coupled to the reel mechanism and the tow line for increasing the reeling power of the apparatus, wherein the activation comprises controlling the second reel mechanism with the controller. In some embodiments, the reel mechanism is detachably coupled to the one or more support beams of the boom. In some embodiments, the method further comprises a load alarm mechanism coupled with the reel mechanism such that during operation of the reel mechanism the load alarm mechanism is able to monitor the load on the reel mechanism. In some embodiments, the load alarm mechanism is configured to stop the reeling of the reeling mechanism if the detected load reaches a predetermined load threshold. In some embodiments, the load alarm mechanism is configured to cause one or more alarm signals to be output if the reel mechanism is in operation, if the detected load reaches the predetermined load threshold or if the detected load is approaching the predetermined load threshold. In some embodiments, the one or more alarm signals comprise one or more of audio signals, radio frequency signals and radio signals having a short wavelength and ultra high frequency (e.g. Bluetooth signals).

BRIEF DESCRIPTION OF THE DRAWINGS

Embodiments of the victim retrieval apparatus are described relative to the several views of the drawings. Where appropriate and only where identical elements are disclosed and shown in more than one drawing, the same reference numeral will be used to represent such identical elements.

DETAILED DESCRIPTION OF THE PRESENT INVENTION

Embodiments of the present invention are directed to a victim retrieval apparatus for use with any type of rescue vehicle including both smaller ones as well as much larger standard rescue apparatus like fire engines or heavy rescue vehicles. In some embodiments, the retrieval apparatus comprises a winch, a rescue basket with or without wheels, and a remote control that controls the speed of the winch. The remote control is able to be attached via an electric cord to the winch. Alternatively, the remote control is able to be wireless and operate using Blue-Tooth, Infra-Red technology or other technology that encompasses hand-held wireless technology. Thus, the remote is able to be carried separately by a rescuer as they descend with the basket or be manned at the winch by another rescuer that is reading hand signals from those below. The articulating head of the boom comprises a rotatable pulley for receiving the rescue line and a safety pulley mounted to the underside of the articulating head piece that enables a safety line to be coupled to the boom thereby ensuring the safety of the position of the rescue basket. The victim retrieval apparatus is quickly, in comparison to the current Z-pulley technique, assembled onto a vehicle and secured by a safety line and is remotely controlled both down and up the slope. Use of the remote control by the descending rescuers eliminates the need for hand signals between the rescuers and the person at the vehicle.

Reference will now be made in detail to implementations of the victim retrieval system as illustrated in the accompanying drawings. The same reference indicators will be used throughout the drawings and the following detailed description to refer to the same or like parts. In the interest of clarity, not all of the routine features of the implementations described herein are shown. To understand the final configuration, one must know that the rescue boom apparatus is in the stored position when not in use and is assembled by being removed from the storage fixture on the rescue vehicle and installed in just a few minutes at the site of the rescue. It will also be appreciated that in the development of any such actual installation, numerous end-user specific features will be allowed to achieve the developer's specific goals, such as compliance with various market applications or business related constraints, and that these specific criteria will vary from one application to another and from one developer to another. Moreover, it will be appreciated that such a development effort might be complex and time-consuming, but would nevertheless be a routine undertaking of engineering and fabricating for those of ordinary skill in the art having the benefit of this disclosure.

Figure 1:
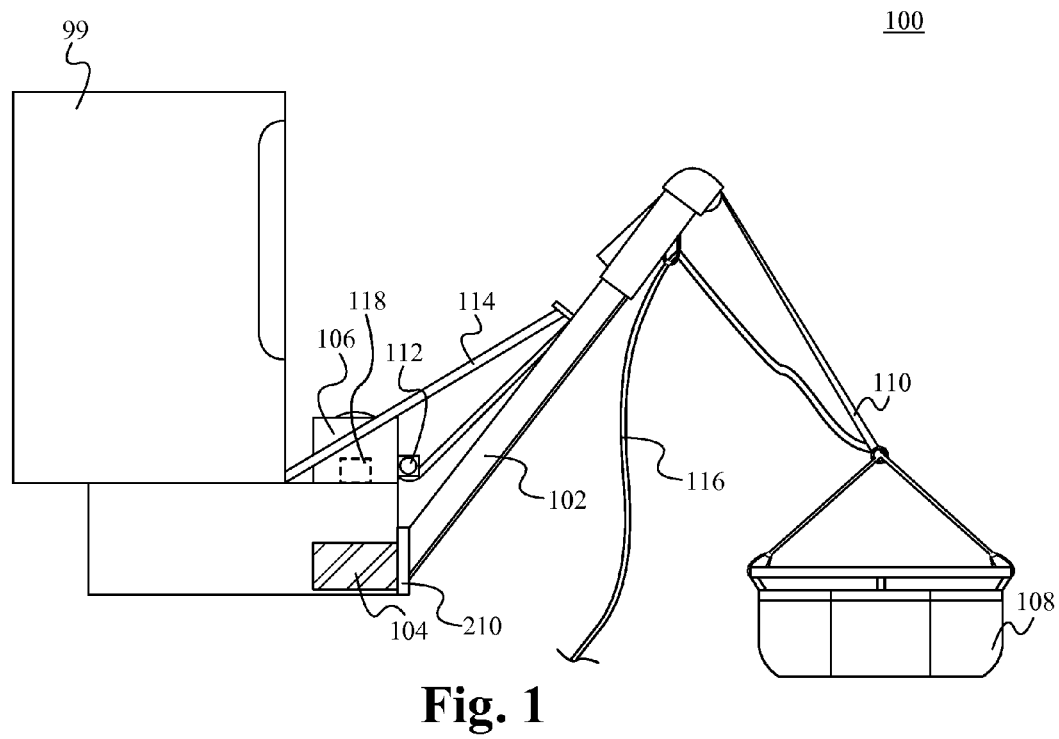
FIG. 1 illustrates a profile view of a victim retrieval apparatus according to some embodiments.

FIG. 1 illustrates a profile view of a victim retrieval apparatus 100 according to some embodiments. The retrieval apparatus 100 comprises two main beams 102, one or more receiver hitches 104, a winch 106, a rescue basket 108, a rescue rope 110, a fair lead fixture 112, a safety line 116, an alarm mechanism 118 and one or more side-load straps 114. In some embodiments, the retrieval apparatus 100 comprises one or more additional components and/or one or more of the components are able to be omitted. For example, in some embodiments the apparatus 100 comprises one or more additional winches, for example a capstan winch, which is able to be either attached permanently to a rescue vehicle 99, or be adjacent to the winch 106 in order to provide increased distance for rescue by allowing a longer rope to be tied to the original winch rope while maintaining the mechanical assistance of the capstan winch. Further, in some embodiments the apparatus 100 is able to comprise one or more storage components for the retrieval apparatus 100 or accessory components (not shown), wherein the storage components are coupled to the vehicle 99 or other object for securely storing the apparatus 100 on the vehicle 99. For example, the storage components are able to comprise one or more of carry boxes, hangers with straps, welded brackets and/or industrial grade Velcro® straps coupled to the vehicle 99. Moreover, in some embodiments the apparatus 100 is able to comprise a rope gun or line launching device that is detachably coupled to the boom 102. For example, the rope gun is able to be attached to one or more of the main beams 202 of the boom 102 and used to propel a line across a distance (e.g. a stream) so that the line may be tied off across the distance between the apparatus 100 and a stanchion point. This provides the advantage of providing safer water and other difficultly traversed obstacle rescues.

As shown in FIG. 1, the two main beams 202 (see FIG. 2) of the boom 102 couple to the vehicle 99 or other object via the one or more receiver hitches 104. In some embodiments, the receiver hitches 104 are able to be supplemented with or replaced by welded solid stock, hinge mechanisms, and/or other attachment mechanisms capable of securely attaching the support beams 202 to the vehicle 99 as are well known in the art. In some embodiments, once coupled to the receiver hitches 104, the boom 102 forms a 45 to 55 degree angle with the ground. Alternatively, the boom 102 is able to form other angles with the ground. The side load straps 114 are coupled between the vehicle 99 and the support main beams 202 of the boom 102 in order to relieve a portion of any side or transverse loads experienced by the boom 102. In some embodiments, the side-load straps 114 are able to be replaced or supplemented other suitable materials such as tube stock and/or solid tow bars that are able to snap-on or attach in other ways to the support beams 202. The winch 106 and fair lead fixture 112 are able to be coupled to the vehicle 99, wherein the rescue line 110 is fed from the winch 106 through the fair lead fixture 112 and the pulley 208 (see FIG. 2) of the boom 102 to the point at which the line 110 couples to the rescue basket 108. The winch 106 is able to be used to control the victim retrieval by lowering the rescue basket 108, and the fair lead fixture 112 is able to prevent the rescue line 110 from binding or catching during operation of the victim retrieval apparatus 100. Further, because the pulley 208 is rotatable, the victim retrieval apparatus 100 is able to operate effectively at angles up to 0 and 180 degrees and greater with respect to the perimeter of the vehicle 99 and or the orientation of the boom 102. In some embodiments, the rescue line 110 comprises a climbing rope. Alternatively, the rescue line 110 is able to comprise one or more of a rope, a cable, and a winch cable or other suitable material. In some embodiments, the winch 106 is an electric hydraulic winch. Alternatively, the winch 106 is able to comprise any combination of an electric hydraulic winch, a gas hydraulic winch, a fully or partially solar powered winch, battery powered winch, a remote generator powered winch or other types of reeling mechanisms. In some embodiments, the fair lead fixture 112 comprises steel. Alternatively, the fair lead fixture 112 is able to comprise e-glass tubing with a free spinning, bushing-style design and/or a Hardigg style case.

The alarm mechanism 118 is coupled with the winch 106 such that it is able to monitor the operation and/or load on the winch 106. As shown in FIG. 1, the alarm mechanism 118 is integrated with the winch 106. Alternatively, the alarm mechanism 118 is able to be a separate device that is wired or wirelessly coupled with the winch 106. For example, in some embodiments the alarm mechanism 118 is able to be positioned on the rescue basket 108 while it monitors the operation and/or load on the winch 106. In operation, the alarm mechanism 118 is able to produce control signals that are used to generate and/or adjust audible or non-audible signals based on the operation of winch 106 in order to indicate the status of the winch 106. The adjustments to or different audible and/or non-audible signals are able to be produced based on whether the winch 106 is in operation, the current load on the winch 106, the change in load on the winch 106, whether the winch 106 is retracting or extending the line 110 or other statuses of the winch 106. For example, the alarm mechanism 118 is able to cause a first audible signal to be generated whenever it detects the winch 106 is in operation and a second or adjusted audible signal to be generated if it detects the load on the winch has reached a predetermined threshold (e.g. the load limit of the winch 106). Similarly, the alarm mechanism 118 is able to cause first and second/adjusted non-audible signals (e.g. radio frequency (RF) or short wavelength and ultra high frequency (e.g. Bluetooth signals)) to be generated that are received by devices of the rescuers and cause the devices to indicate that status of the winch 106 (e.g. in operation or at load threshold). Further, in some embodiments the alarm mechanism 118 is able to produce control signals that automatically stop the operation such as the reeling in or retracting of the line 110 by the winch 106 when the alarm mechanism 118 detects that the predetermined load threshold has been reached. For example, if the operator is retracting the line 110 to retrieve a victim and the load on the line 110 reaches the load threshold, the alarm mechanism 118 will lock the line in place, thereby not releasing the line, but preventing the load from exceeding the threshold. As a result, the alarm mechanism 118 is able to provide the benefit of preventing the operator from exceeding a predefined load limit (e.g. the load limit of the winch) and thereby risking malfunction and/or failure of the winch 106 and/or line 110. As a result, the alarm mechanism 118 is able to provide a warning to the operators that operation has begun and/or that the winch 106 is reaching or has reached its load limit.

The alarm mechanism 118 is able to adjust the frequency, pitch and/or volume of the audible signals based on the operation and/or load on the winch 106. For example, the mechanism 118 is able to increase, decrease or otherwise adjust the frequency, volume and/or pitch of the signals as the winch 106 begins operations and/or as the load on the winch 106 increases, decreases and/or approaches a predetermined load threshold. In some embodiments, the alarm mechanism 118 comprises one or more speakers that output audible alarm signals. Alternatively, the alarm mechanism 118 is able to couple with and control remote audio mechanisms for producing audible alarm signals. For example, the alarm mechanism 118 is able to wired or wirelessly couple to the vehicle 99 in order to utilize the horn or other audio generating mechanisms of the vehicle in order to produce the audible alarm signals. In some embodiments, the alarm mechanism 118 is able to transmit and/or receive short wavelength and ultra high frequency (e.g. Bluetooth signals), RF and/or other types of signals. For example, the alarm mechanism 118 is able to utilize short wavelength and ultra high frequency (e.g. Bluetooth signals), RF or other types of signals as the control signals to couple with and control the vehicle 99 and/or to send an alarm signal to a device carried by the rescuers that indicates the alarm to the rescuers. In some embodiments, the alarm mechanism 118 is programmable such that under what conditions the signals are produced (e.g. when in operation, at a predetermined load threshold) and the type signals produced for each condition is able to be selectively programmed by a user. As a result, the alarm mechanism 118 provides the advantage of adjusting for different types of winches and systems having different load tolerances and other characteristics.

Figure 2:
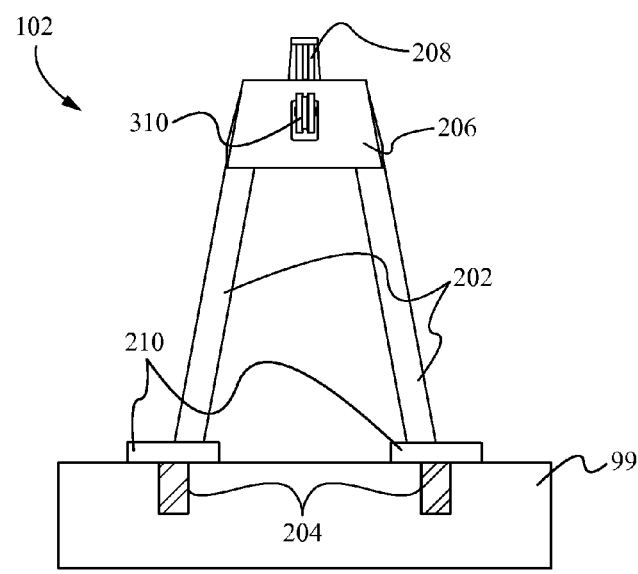
FIG. 2 illustrates a detailed bottom view of an articulating boom according to some embodiments.
Figure 3A:
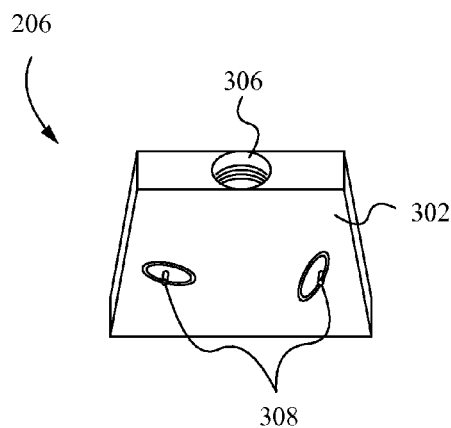
FIG. 3A illustrates a front view of a boom head base according to some embodiments.
Figure 3B:
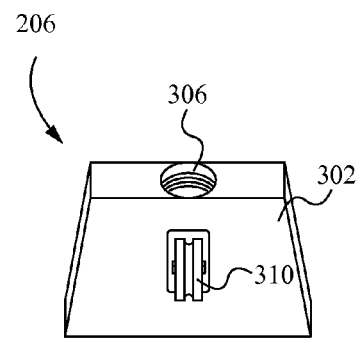
FIG. 3B illustrates a back view of a boom head base according to some embodiments.
Figure 3C:
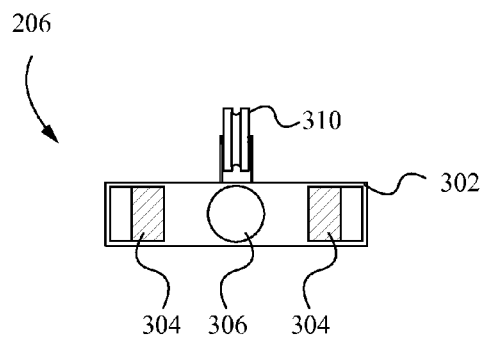
FIG. 3C illustrates a top view of a boom head base according to some embodiments.
Figure 3D:
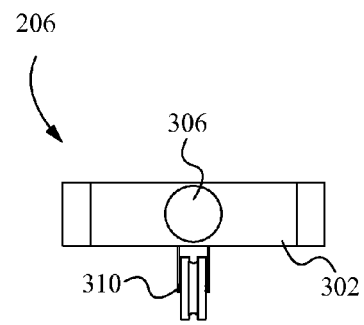
FIG. 3D illustrates a bottom view of a boom head base according to some embodiments.

FIG. 2 illustrates a detailed bottom view of the articulating rescue boom 102 according to some embodiments. As shown in FIG. 2, the assembled articulating rescue boom 102 comprises a plurality of support beams 202 coupled to receiver hitch stubs 204, a boom head base 206 and a boom head main pulley 208. The support beams 202 utilize the stubs 204 to couple to the receiver hitches 104 as shown in FIG. 1. The receiver hitches 104 are able to be secured to the vehicle 99 with one or more angle transition plates 210. The boom head base 206 couples the top of the support beams 202 together and provides a pulley channel 306 (see FIGS. 3A-D) for receiving the boom head main pulley 208. In some embodiments, the support beams 202 comprise steel tubing. Alternatively, the support beams 202 are able to comprise any combination of steel, titanium and/or composite materials (e.g. S-glass or E-glass), carbon fiber (e.g. using custom wrap angles), and other resins/epoxies as are well known in the art. In some embodiments, the support beams 202 are coated with a composite layer and/or other polymer products for providing increased corrosion resistance.

FIGS. 3A-3D illustrate a front, back, top and bottom view of the rescue boom head base 206 according to some embodiments. Specifically, the boom head base 206 comprises a pair of locking pins 308, a knot-passing pulley 310 and a body 302 having a pair of support beam cavities 304 and a main pulley channel 306. The support beam cavities 304 are positioned at angles to receive the support beams 202 wherein the locking pins 308 are able to lock the support beams 202 within the support beam cavities 304 thereby securing the top of the boom 102 together. Alternatively, the support beams 202 are able to be secured within the support beam cavities 304 using other types of fasteners as are well known in the art. The channel 306 is configured to receive the body of the main pulley 208 and enable the main pulley 208 to rotate within the channel 306 as needed during operation of the apparatus 100. The knot-passing pulley 310 for receiving the safety line 116 is coupled to the bottom of the boom head base 206 such that the knot-passing pulley 310 is able to be coupled to a safety line 116 (see FIG. 1) when the boom 102 is in operation in order to further ensure a static location of the rescue basket should a failure occur in the main rescue apparatus system allowing the main rescue line to contain unwanted and instant slack. The attached side load straps 114, attached to the main beams 202 provide the advantage that in the case of failure of a portion of the apparatus 100, these side load straps 114 will also ensure the rescuers and victims are not injured by the failure.

Figure 4:
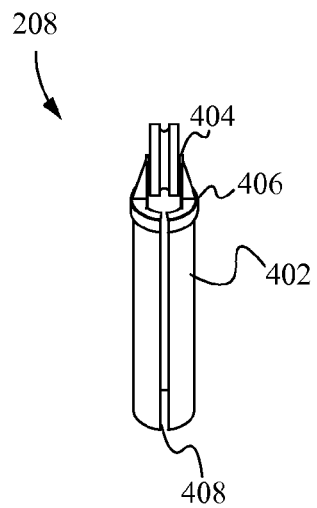
FIG. 4 illustrates a detailed view of a boom head main pulley according to some embodiments.

FIG. 4 illustrates a detailed view of the boom head main pulley 208 according to some embodiments. As shown in FIG. 4, the main pulley 208 comprises a cylindrical hollow body 402 serving as the rescue line channel 408, a pulley head 404 and a collar bearing 406. The body 402 of the main pulley 208 is sized so that it is able to slide into the channel 306. The rescue line channel 408 enables the rescue line 110 to be threaded through the body 402 of the main pulley 208 and around the pulley head 404, wherein the main pulley 208 is then able to be inserted into the channel 306 of the boom head base 206. As a result, the main pulley 208 is able to freely rotate within the channel 306 as rescue line 110 is moved with respect to the boom 102. The collar bearing 406 is configured to abut the bottom of the pulley head 404 and the top of the channel 306 of the base 206, such that the bearing 406 enables the main pulley 208 to rotate within the channel 306, while receiving the weight of the victim being hoisted, without damaging the body 402 of the main pulley 208 or the body of the base 206. In some embodiments, the bearing 406 comprises brass. Alternatively, the bearing 406 is able to comprise any combination of brass, nylon or other composite materials as are well known in the art. In some embodiments, the collar bearing 406 is able to be replaced with one or more ball bearings or other types of bearings as are well known in the art.

Figure 5A:
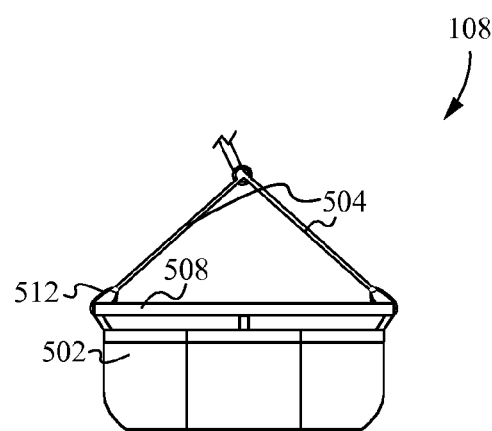
FIG. 5A illustrates a detailed view of a rescue basket according to some embodiments.
Figure 5B:
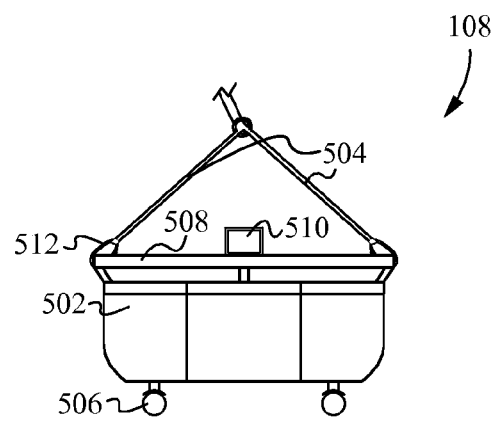
FIG. 5B illustrates a detailed view of a rescue basket according to some embodiments.

FIGS. 5A and 5B illustrate detailed views of the rescue basket 108 according to some embodiments. In some embodiments, the rescue basket 108 is able to have metal rails 508 and be certified and designated for short-haul use as described by fire departments for use to rescue victims in an over-bank type rescue so as to allow for attachments of leveling straps 504 and carabineers 512. As shown in FIG. 5A, the rescue basket 108 comprises a body 502, a plurality of straps 504, one or more carabineer nodes 512 and a continuous lifting rail 508. In some embodiments, the rescue basket 108 is able to further comprise one or more wheels 506 and/or a remote winch controller 510 as shown in FIG. 5B. In some embodiments, the body 502 comprises a Stokes rescue basket. Alternatively, the body 502 is able to comprise a flat backboard, a flexible sling, or any other object designed to securely carry people or other items to be rescued. The plurality of straps 504 are selectively coupled together and to the perimeter of the body 502 such that the straps 504 enable the rescue line 110 to detachably couple to the basket 108. In some embodiments, the straps 504 are adjustable such that a rescuer is able to adjust the length of one or more of the straps 504 to keep the basket 108 level. The lifting rails 508 are coupled to the perimeter of the body 502 and sized such that one or more rescuers are able to couple to the rails 508 and lift the basket 108 while keeping their hands free to treat the victim. The carabineer nodes 512 enable one or more rescuers or support straps 504 to securely detachably couple to the rescue basket 108. In some embodiments, the rails 508 are aluminum. In some embodiments wheels 506 are coupled to the bottom of the body 502. In some embodiments, the wheels 506 are able to selectively extend or telescope such that the basket 108 is supported and is able to roll at a height above the ground. In some embodiments, the wheels 506 are able to selectively retract such that basket 108 is able to be rested on the body 502 without the possibility of rolling on the wheels 506. As a result, the apparatus 100 provides the advantage of enabling the rescuers to more easily guide/navigate the basket 108 to and from the victim.

As shown in FIG. 5B, the remote winch controller 510 is able to be detachably coupled to the body 502 by magnet, Velcro or other suitable attachment method when using the hand-held version or it is alternatively attached directly to the winch 106 by an electrical cord. This enables the rescuers to remotely control the operation of the winch 106 as the winch 106 raises and lowers the basket 108. As a result, the apparatus 100 provides the advantage of enabling the basket 108 to be controlled at the basket location reducing the need to maintain visual or other types of contact with the vehicle 99. This is especially beneficial when there are a limited number of rescuers available as a single rescuer is able to operate the apparatus 100 while responding to the needs of the victim. In some embodiments, the controller 510 comprises wireless coupling to the winch 106 and/or a voice activated command interface. This would enable a rescuer to control the apparatus 100 "hands free" so that their hands are able to be used to assist the victim. Additionally, in some embodiments, the basket 108 comprises one or more of a pulsimeter/oxymeter, an oxygen/"O2" bottle, a defibrillator unit, a blood-pressure cuff, an inflatable splint, a toolbox style compartment, an automatic CPR machine, a rangefinder, and a fan-folded shock blanket that is able to be made from materials that are suitable for treating victims of shock including a battery charged electric style heated shock blanket powered by solar or other energy device such as battery with an automatic shut-off of 10 minutes, heating to a maximum of 105 degrees.

Figure 6:
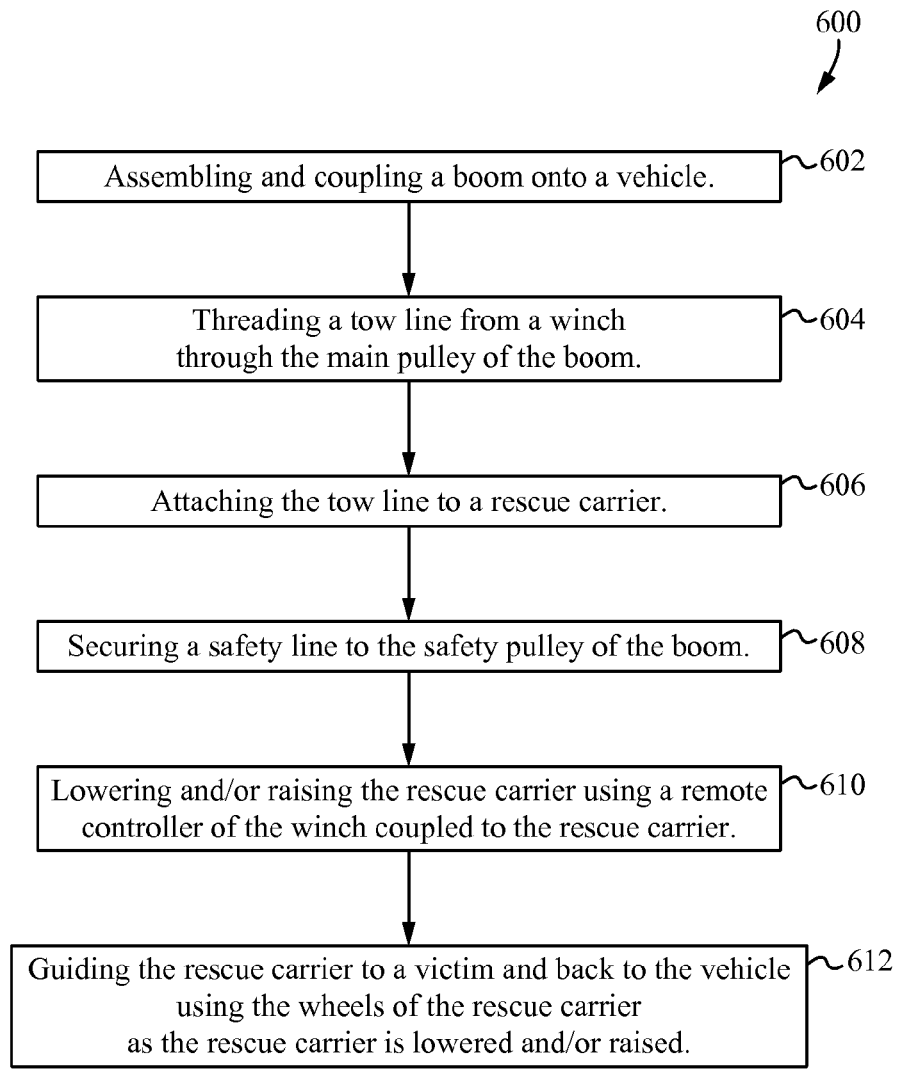
FIG. 6 illustrates a flow chart of a method of rescue a victim according to some embodiments.

FIG. 6 illustrates a flow chart illustrating a method of retrieving a victim according to some embodiments. A rescuer assembles and couples the boom 102 onto the vehicle 99 at the step 602. The rescuer threads the rescue line 110 from the winch 106 through the main pulley 404 of the boom 102 at the step 604. The rescuer attaches the rescue line 110 to the rescue basket or other container 108 at the step 606. The rescuer passes a rescue line through a knot-passing pulley 310 of the boom head base 206 at the step 608, securing the line to the rescue basket 108. The rescuer activates the winch 106 to allow the basket 108 to be leveraged to a level position by using the rescuers as the angle of interface between the basket and the ground and by adjusting the straps 504 on the basket 504 at step 610. In some embodiments, the rescuer lowers and/or raises the basket 108 using voice commands received by the controller 510. The rescuer guides the rescue carrier 108 to the victim and back to the vehicle 99 using appropriate winch speed controlled by the remote control 510, leverage and technique of the rescuers in combination with adjustable leveling straps 504 at the step 612. In some embodiments, the method further comprises extending the wheels 506 of the carrier/basket 108 at the top of the embankment so that the victim is able to be pushed on those wheels 506 to a waiting ambulance or other vehicle at a standard stretcher height. Alternatively, the wheels 506 are able to be retracted by the rescuer. As a result, the victim is able to be moved easily from the rescue carrier 108 to an ambulance Stryker gurney typical to most ambulances greatly reducing the amount of lifting the rescuers must do and reducing further trauma to the victim.

Figure 7A:
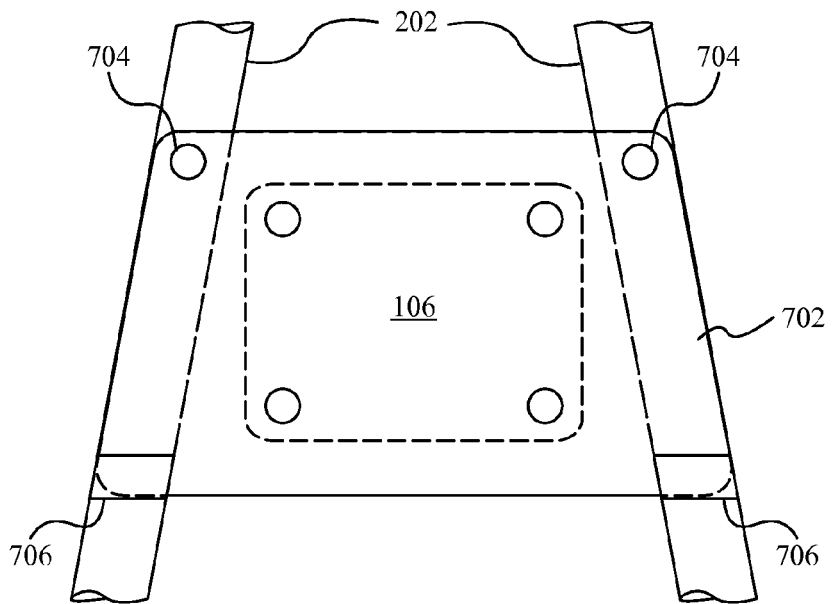
FIG. 7A illustrates a top view of an articulating boom according to some embodiments.
Figure 7B:
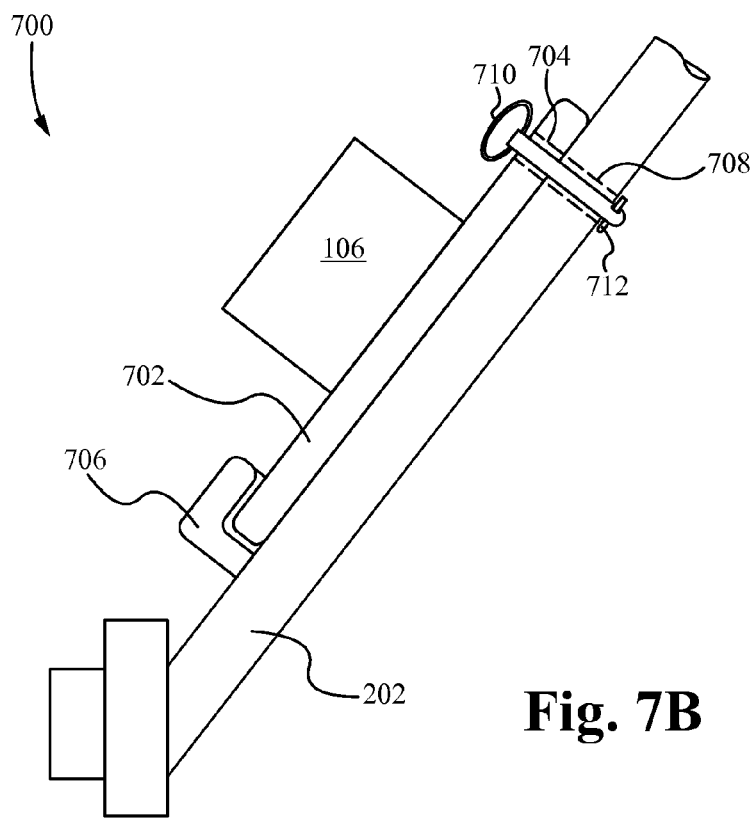
FIG. 7B illustrates a cross-sectional view of an articulating boom according to some embodiments.

FIGS. 7A and 7B illustrate top and cross-sectional views respectively of the retrieval apparatus 700 according to some embodiments. The retrieval apparatus 700 shown in FIGS. 7A and 7B is substantially similar to the retrieval apparatus 100 described above except for the differences described herein. In particular, as shown in FIGS. 7A and 7B, the winch 106 of the retrieval apparatus 700 is detachably coupled to the support beams 202 instead of to the vehicle 99. As a result, the apparatus 700 provides the benefit of being able to operate with vehicles or other objects that do not have the room or capability to securely support the winch 106. As shown in FIG. 7A, the winch 106 is permanently or detachable coupled to a base plate 702 having a plurality of plate apertures 704 and the support beams 202 each comprise a beam aperture 708 (see FIG. 7B) that is able to align with a plate aperture 704 and a stop channel 706 having a side wall 707 protruding from a top surface of the beams 202. In some embodiments, the side wall 707 is able to be omitted. In some embodiments, one or more additional plate apertures 704 and corresponding beam apertures 708 are able to be added to the base plate 702 and beams 202 respectively. Although the plurality of plate apertures 704 are shown at the top corners of the plate 702, they are able to be positioned anywhere on the plate 702 wherein the apertures 704 are able to simultaneously align with the beam apertures 708.

When coupled to the support beams 202, as shown in FIG. 7B, the corners and/or sides of the base plate 702 are slid into the stop channels 706 such that the side walls 707 prevent the base plate 702 from moving laterally out of the stop channels 706 and the bottom and top of the stop channel 704 prevent the base plate 702 from sliding down the beams 202 or being pulled out of the stop channels 704. When positioned within the stop channels 704, the plate apertures 704 each align with one of the beam apertures 708 such that the top of the base plate 702 is able to be detachably secured to the beams 202 using a first pin 710 that slides through both the plate and beam apertures 704, 708 and a second pin 712 that secures the first pin 710 in place. Alternatively, other fastening means are able to be used to detachably couple the winch 106 to the beams 202. In some embodiments, the edges of the base plate 702 are angled such that they match the angle of the support beams 202 when the boom 102 is assembled. Alternatively, the base plate 702 is able to be comprise other shapes capable of detachably coupling to the support beams 202. As a result, the apparatus provides the advantage of an easily assembled and disassembled boom 102 having a detachably coupled winch 106 such that another mount for the winch is unnecessary.

Thus, it is clear that the retrieval apparatus described herein has numerous advantages. Specifically, the victim retrieval apparatus is able to quickly be assembled onto a variety of vehicles for various types of over-bank or in any location where a victim retrieval is needed. Further, the apparatus provides the benefit of being able to be remotely control the operation of the victim retrieval from the carrier location instead of the vehicle location. This enables rescuers to react to issues that arise at the carrier location without needed to be in visual contact with a vehicle operator. Moreover, the victim retrieval is assembled in a fraction of the time it takes to assemble the conventional and traditional Z-Pulley method allowing for a much faster, safer and more efficient rescue for the victim. This ensures a safer method of rescue for the rescuers and reduces fire/rescue-related losses including human losses. Further, the rescue basket described herein has a variety of victim monitoring equipment and other things which are able to include a plurality of wheels reducing the friction between the basket and the terrain. Additionally, the victim retrieval device is able to quickly be assembled onto a vehicle, utilize remote control and assure a faster, safer and more efficient over-bank or rugged terrain rescue for both victims and rescuers alike.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications are able to be made in the embodiment chosen for illustration without departing from the spirit and scope of the invention. In particular, it is understood that although the retrieval apparatus is described herein with reference to retrieving victims, the retrieval of other objects is contemplated.

What is claimed is:

1. A retrieval apparatus for retrieving victims from an area, the apparatus comprising:
    a reel mechanism configured to controllably reel in or let out a rescue line;
    a basket coupled to the reel mechanism via the rescue line; and
    a boom comprising:
        a plurality of support beams;
        a boom head including a respective receiving cavity for each of the support beams, one or more support beam fasteners that are each configured to detachably couple a separate one of the support beams within a separate one of the receiving cavities, and a through hole, wherein when detachably coupled to within the receiving cavities by the support beam fasteners, the support beams are angled such that together the boom head and the support beams form a V-shape; and
        a rotatable pulley including a tubular body and a pulley head coupled to a first end of the tubular body, wherein the tubular body is configured to slide into the through hole such that the tubular body is able to rotate about a first axis within the through hole with respect to the boom head, wherein the pulley head is able to rotate about a second axis with respect to the tubular body and is able to rotate about the first axis along with the tubular body with respect to the boom head;
    wherein the rescue line extends from the reel mechanism to the basket through the through hole of the boom head and the tubular body of the rotatable pulley onto the pulley head of the rotatable pulley such that the tubular body and the pulley head rotate about the first axis based on the outgoing angle of the rescue line to the basket.

2. The apparatus of claim 1 wherein the support beams and the rotatable pulley are detachably coupled together by the boom head.

3. The apparatus of claim 1 further comprising an anchor object having one or more hitches, wherein the support beams of the boom are detachably coupled to the anchor object via the hitches.

4. The apparatus of claim 3 further comprising one or more support members coupled between the support beams and the anchor object.

5. The apparatus of claim 4 wherein the anchor object is a vehicle.

6. The apparatus of claim 1 further comprising a safety line coupled to the basket, wherein safety line is positioned though a safety pulley on the boom head.

7. The apparatus of claim 1 wherein the basket comprises one or more wheels positioned on the bottom of the basket such that the basket is able to roll on the wheels.

8. The apparatus of claim 7 wherein the wheels are extendable such that the basket is able to be raised to a desired height while being supported by the wheels.

9. The apparatus of claim 1 wherein the basket comprises a controller that controls the operation of the reel mechanism.

10. The apparatus of claim 9 wherein the controller is detachably coupled to the basket.

11. The apparatus of claim 9 wherein the controller is a wireless controller that wirelessly communicates with and controls the reel mechanism.

12. The apparatus of claim 9 wherein the controller is voice activated.

13. The apparatus of claim 1 wherein the basket comprises a lifting rail positioned along the perimeter of a body of the basket.

14. The apparatus of claim 13 wherein the basket comprises a plurality of adjustable straps that are able to be adjusted in length and couple the basket to the rescue line.

15. The apparatus of claim 1 further comprising a fair lead device coupled to the reel mechanism, wherein the fair lead device receives the rescue line before the rescue line enters or exits the reel mechanism in order to prevent the rescue line from binding.

16. The apparatus of claim 1 further comprising a second reel mechanism coupled to the reel mechanism and the rescue line for increasing the reeling power of the apparatus.

17. The apparatus of claim 1 wherein the reel mechanism is detachably coupled to the one or more support beams of the boom.

18. The apparatus of claim 1 further comprising a load alarm mechanism coupled with the reel mechanism such that during operation of the reel mechanism the load alarm mechanism is able to monitor the load on the reel mechanism.

19. The apparatus of claim 18 wherein the load alarm mechanism is configured to stop the reeling of the reeling mechanism if the detected load reaches a predetermined load threshold.

20. The apparatus of claim 18 wherein the load alarm mechanism is configured to cause one or more alarm signals to be output if the reel mechanism is in operation, if the detected load reaches the predetermined load threshold or if the detected load is approaching the predetermined load threshold.

21. The apparatus of claim 20 wherein the one or more alarm signals comprise one or more of audio signals, radio frequency signals and ultra high frequency signals.

22. A retrieval apparatus for retrieving victims from an area, the apparatus comprising:
    a reel mechanism configured to controllably reel in or let out a rescue line;
    a basket coupled to the reel mechanism via the rescue line; and
    a boom comprising:
        a plurality of support beams;
        a boom head including a receiving cavity for each of the support beams, one or more support beam fasteners that are each configured to detachably couple a separate one of the support beams within a separate one of the receiving cavities, and a through hole, wherein when detachably coupled to within the receiving cavities by the support beam fasteners, the support beams are angled such that together the boom head and the support beams form a V-shape; and
        a rotatable pulley including a tubular body and a pulley head coupled to a first end of the tubular body, wherein the tubular body is configured to slide into the through hole such that the tubular body is able to rotate about a first axis within the through hole with respect to the boom head, wherein the pulley head is able to rotate about a second axis with respect to the tubular body and is able to rotate about the first axis along with the tubular body with respect to the boom head;
    wherein the rescue line extends from the reel mechanism to the basket through the through hole of the boom head and the tubular body of the rotatable pulley onto the pulley head of the rotatable pulley such that the tubular body and the pulley head rotate about the first axis based on the outgoing angle of the rescue line to the basket, wherein the tubular body has an open slit that extends the length of the tubular body for enabling the insertion of the rescue line within the tubular body.

* * * * *